US006422544B1

(12) United States Patent
Ohlsson

(10) Patent No.: US 6,422,544 B1
(45) Date of Patent: Jul. 23, 2002

(54) VIBRATION ISOLATOR

(76) Inventor: Björn Ohlsson, Klågerupsvägen 357, S-212 36 Malmo (SE)

( * ) Notice: Subject to any disclaimer, the term of this patent is extended or adjusted under 35 U.S.C. 154(b) by 0 days.

(21) Appl. No.: 09/552,237

(22) Filed: Apr. 19, 2000

(30) Foreign Application Priority Data

May 4, 1999 (SE) ................................................ 9901592

(51) Int. Cl.⁷ ............................................... F16M 9/00
(52) U.S. Cl. ....................................................... 267/136
(58) Field of Search ........................... 188/267, 378–380; 248/636, 638; 181/208, 209; 267/136

(56) References Cited

U.S. PATENT DOCUMENTS

| | | | | |
|---|---|---|---|---|
| 4,314,623 A | * | 2/1982 | Kurokawa | 188/267 |
| 4,690,960 A | * | 9/1987 | Yamauchi et al. | 523/442 |
| 5,197,707 A | | 3/1993 | Kohan | |
| 5,330,163 A | * | 7/1994 | Bodin et al. | 267/140.13 |
| 5,876,024 A | * | 3/1999 | Hain | 267/141.4 |
| 5,945,643 A | * | 8/1999 | Casser | 181/290 |

FOREIGN PATENT DOCUMENTS

FR 0213043 * 12/1986

* cited by examiner

*Primary Examiner*—Christopher P. Schwartz
(74) *Attorney, Agent, or Firm*—Tarolli, Sundheim, Covell, Tummino & Szabo L.L.P.

(57) ABSTRACT

The present invention relates to a vibration isolator for isolating vibrations generated between units (2, 3) of which at least one unit is an electronic unit (3), wherein the vibration isolator (1) includes a first member (4) which cooperates with a first one of the units (2, 3) and a second member (5) which cooperates with a second one of the units (2, 3) and wherein a device (6) is provided for isolating vibrations between the units (2, 3). The isolating device (6) includes isolating structures (7) which are freely suspended between the first and the second members (4, 5) such that the structures (7) can spring in a vertical plane (VP) and a horizontal plane (HP) as well as in other directions relative to the units (2, 3), whereby the isolating structures (7) isolate vibrations between the units (2, 3) in the vertical plane (VP), the horizontal plane (HP) and other planes.

8 Claims, 2 Drawing Sheets

VIBRATION ISOLATOR

BACKGROUND OF THE INVENTION

The present invention relates to a vibration isolator for isolating vibrations generated between units of which at least one unit is an electronic unit, wherein the vibration isolator includes a first member which cooperates with a first one of the units and a second member which cooperates with a second one of the units and wherein a damping device is provided for damping or absorbing vibrations between the units.

In audio systems, different units such as e.g. CD-players, laser disc players, amplifiers or loudspeakers, generate vibrations which must be damped or absorbed in order to eliminate or at least reduce disturbances or interferences in the audio system.

The publication U.S. Pat. No. 5,197,707 describes a platform for vibration absorption. This platform however, lacks an effective isolating device for isolating vibrations.

BRIEF SUMMARY OF THE INVENTION

The object of the present invention is to eliminate this drawback and provide a simple vibration isolator with an effective vibration isolating ability. This is arrived at according to the invention while the initially defined vibration isolator is provided with the characterizing features of subsequent claim 1.

Since the vibration isolator is provided with the characterizing features, it is achieved that the vibration isolator effectively isolates vertical, horizontal and other vibrations relative to electronic units or between such units and a base. Furthermore, it is achieved that the vibration isolator can be provided with vibration damping or absorbing means for not only isolating but also absorbing vibrations.

BRIEF DESCRIPTION OF THE DRAWINGS

The invention will be further described below with reference to the accompanying drawings, in which.

DETAILED DESCRIPTION OF THE INVENTION

Figure 1:
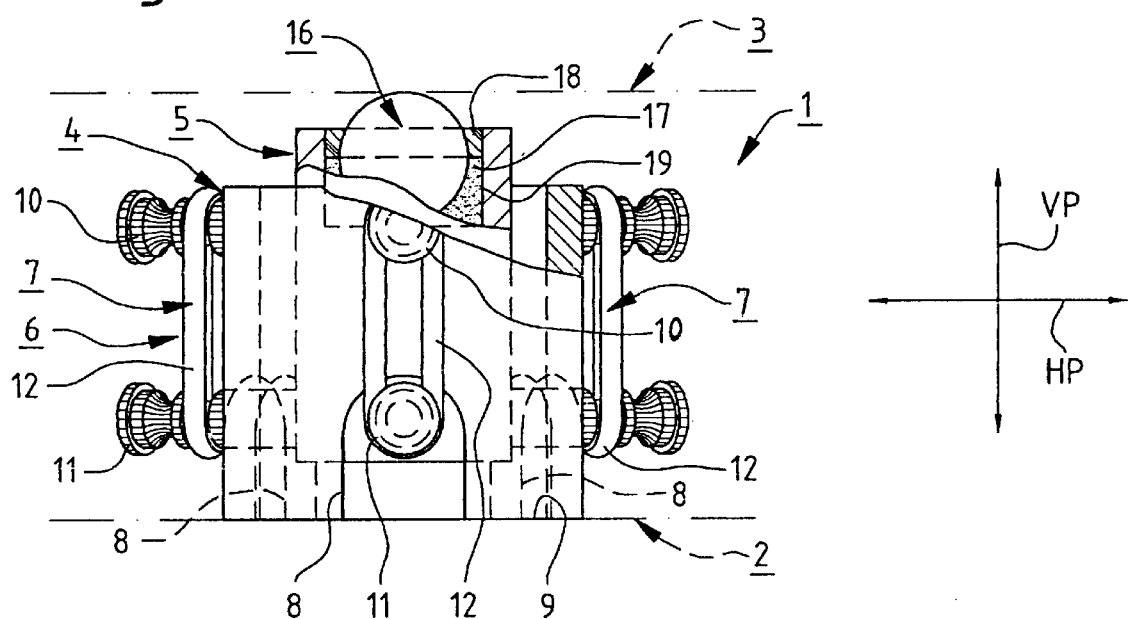
FIG. 1 is a side view of a vibration isolator according to the invention.
Figure 2:
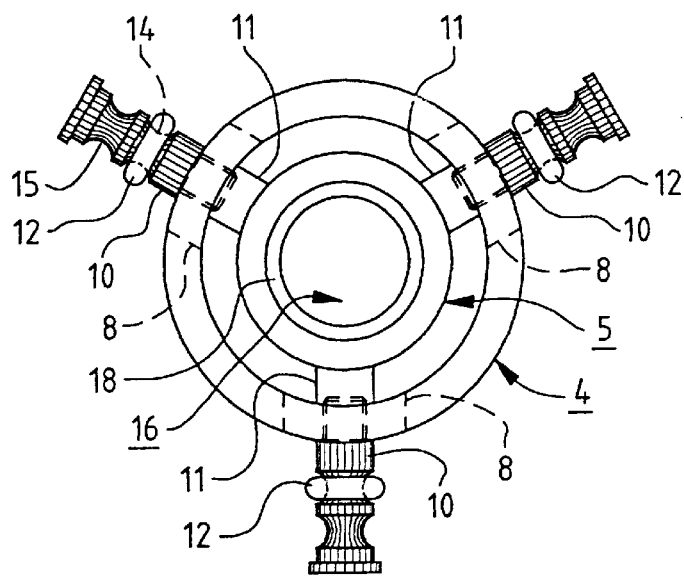
FIG. 2 is a plan view of the vibration isolator of FIG. 1.

The vibration isolator 1 illustrated in the drawings is intended for isolating vibrations between different units 2, 3, e.g. for isolating vibrations between a base 2 and an electronic unit 3. This electronic unit 3 may form part of an audio system, e.g. playing and recording equipment and accessories thereto such as CD-players, laser disc players, record players or loudspeakers.

This first unit 2 may instead of a base or support be an electronic unit in the audio system of this or another type.

The vibration isolator 1 has a first member 4 which rests on the base or support 2 (or an electronic unit) and a second member 5 on which one electronic unit 3 is standing. Between these first and second members 4, 5 there is provided an isolating device 6 for isolating vibrations between the members 4, 5. This isolating device 6 includes at least three isolating means 7. Each isolating means 7 is freely suspended between the first and second members 4, 5 in such manner that it can move in a vertical place VP as well as in a horizontal place HP and also in other directions relative to the first and second members 4, 5. Hereby, the isolating device isolates vibrations between the first and second members 4, 5 in the vertical plane VP as well as in the horizontal plane HP and also in other directions.

The first member 4 consists of, in the illustrated embodiment, a cylindrical sleeve which is open in both ends. This sleeve has three openings 8 which connect to one edge 9 of the sleeve and which extend axially a distance into the sleeve. The openings 8 are preferably uniformly distributed around the sleeve. At the edge portion opposite to the openings 8 there are provided three radially outwards directed brackets 10. These brackets 10 are uniformly distributed around the sleeve, substantially horizontally oriented and are centered with and axially displaced relative to the openings 8.

The second member 5 consists of, at the illustrated embodiment, a cylindrical member having a less outer diameter than the inner diameter of the first member 4 and being located in the first member 4. This second member 5 includes three radially outwards directed brackets 11 which are uniformly distributed about the second member 5 and substantially horizontally directed. Each such bracket 11 extends out through one of the openings 8 in the first member 4 and take a position which is displaced in substantially axial direction relative to a bracket 10 on the first member 4. The brackets 10, 11 of the first and second members may hereby be brought to form three pairs of brackets, each pair being intended for an isolating means 7. Each isolating means 7 provided on a pair of brackets 10, 11 will extend in axial direction relative to the first member 4 and will be located outside and at such distance from the first member 4 that it springs in axial as well as radial direction and in all other directions in relation thereto, whereby the first and second members 4, 5 can spring in the vertical plane VP and in the horizontal plane HP and in other directions relative to each other.

Through this location of the isolating means 7, the means will be substantially vertically oriented relative to the vibration isolator 1.

Each isolating means 7 has, at the embodiment shown, resilient properties and may be shaped as a ring 12 of elastic material. All such rings 12 preferably have the same elastic properties. Each such ring 12 may be an O-ring of rubber material.

Figure 3:
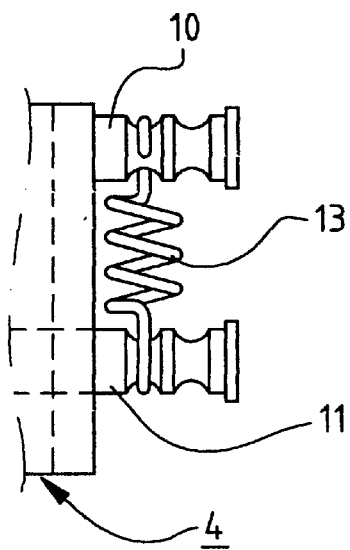
FIG. 3 is a side view of a portion of a vibration isolator according to the invention having alternatively designed components.

As is apparent from FIG. 3, the isolating means 7 may instead of being shaped as a ring consist of a tension spring 13 which is provided to spring in the vertical plane VP and the horizontal plane HP and in other directions.

Each bracket 10, 11 is preferably designed to permit application of at least two isolating means 7 situated beside each other. To this end, each bracket 10, 11 may be provided with at least two grooves 14, 15 located beside each other for engagement by the isolating means 7.

In the embodiment shown, the vibration isolator 1 also includes vibration absorbing means 17 for damping or absorbing mechanical vibrations generated by the unit 3 or units 2, 3, and for absorbing airborne vibrations (i.e. sound during e.g. playing of music) affecting the unit 3 or units 2, 3. This vibration absorbing means 17 may be located between the second member 5 and a third member 16 through which the second member 5 cooperates with the unit 3.

The vibration damping or absorbing means 17 is preferably provided to absorb vibrations between the first and second units 2, 3 in the vertical plane VP, the horizontal plane HP and in other directions. The means 17 is preferably a particle shaped or pulverulent material, e.g. sand, particles of lead or similar, located in a space 19 in the second member 5.

A lower portion of the third member 16 is situated in the means 17 without being in contact with surrounding portions of the second member 5 and an elastic binder 18 is provided between the third member 16 and surrounding portions of the second member 5 for holding the third member 16 and the means 17 in place in the space 19.

The binder 18 has such elasticity that the second and third members 5, 16 can move relative to each other in the vertical plane VP, the horizontal plane HP and in other directions for absorbing vibrations between the second and third members 5, 16.

The third member 16 preferably has a spherical shape, which is advantageous since a spherical body has only a natural frequency and thus, will not add a plurality of resonances.

The third member 16 is preferably made of a rigid material since this part shall only reduce the amplitude of the vibrations and supply the vibrations generated in the units 2 or 3 to the vibration absorbing means 17. The rigid material may e.g. be steel, brass, a ceramic or a composite.

As is apparent from FIG. 1, the vibration isolator 1 may be located such that the first member 4 rests on the base or support 2 and the unit 3 is resting on the third member 16, but the vibration isolator 1 may be located reverse when required.

Figure 4:
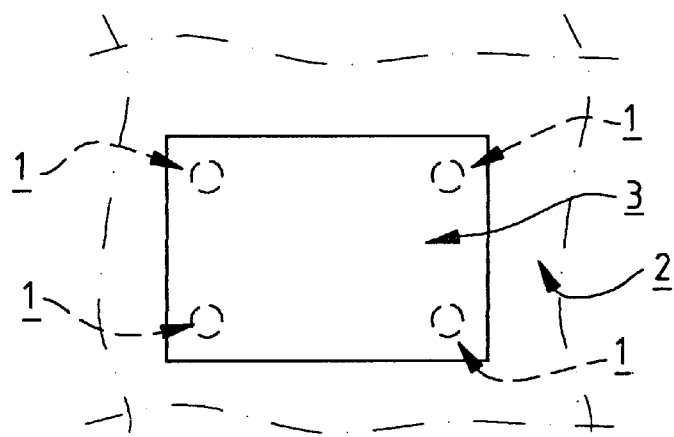
FIGS. 4 and 5 illustrate various dispositions of the vibration isolator according to the invention as feet between an electronic unit and a base.
Figure 5:
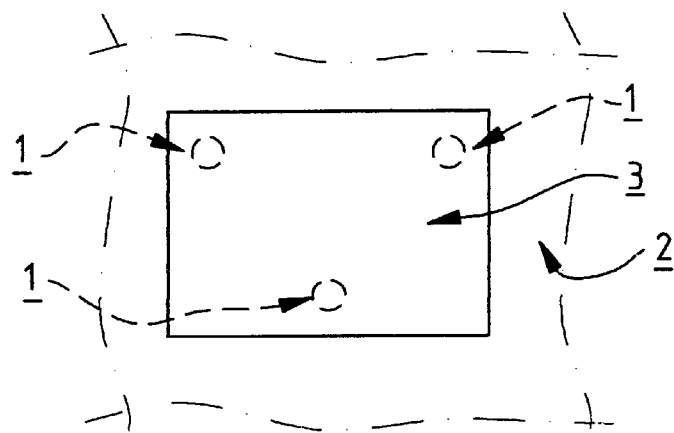

Since the vibration isolator 1 is a separate unit, three or more vibration isolators 1 may be placed as feet in suitable locations between the units 2 and 3. As is apparent from FIG. 4, e.g. four vibration isolators 1 may be placed uniformly distributed between the units 2, 3 or, as is shown in FIG. 5, three vibration isolators 1 may be placed irregularly if advantageous. This shows that a suitable number of vibration isolators 1 can be located in such suitable positions that the underbody of at least one of the units 2 and/or 3 is tuned to a higher resonance frequency.

The invention is not limited to what is described or illustrated in the drawings, but may vary within the scope of the subsequent claims. It should e.g. be mentioned that the first and second members 4, 5 can have another shape than described; the members 4, 5 may consist of metallic material or another rigid material; the isolating means 7 may consist of other components than rings 12 or tension springs 13; there may be another suitable number of isolating means 7 than three; the vibration absorbing means 17 may be of another type than described; the vibration isolator 1 may be used for damping or absorbing vibrations between other units or other units and supports as described, e.g. units in the form of scales or measuring instruments and/or supports therefor.

Except for locating the vibration isolator in direct contact with the electronic units or with the electronic unit and a base or support, the vibration isolator can have indirect contact therewith. Thus, the vibration isolator may e.g. be located between a support and a table on which the electronic unit is placed and so on.

What is claimed is:

1. A vibration isolator for isolating vibrations generated between two units (2, 3) of which at least one unit is an electronic unit (3), wherein said vibration isolator (1) includes a first member (4) connected with a first one of said two units (2, 3) and a second member (5) connected with a second one of said two units (2, 3), and a device (6) for isolating vibrations between said first and second members (4,5), wherein said isolating device (6) includes a plurality of isolating means (7) which are freely suspended between said first and second members (4, 5) such that said isolating means (7) are movable in a vertical plane (VP) and a horizontal plane (HP) as well as in other directions relative to said two units (2, 3), wherein said isolating means (7) isolates vibrations between said two units (2, 3) in said vertical plane (VP) and said horizontal plane (HP) and in other directions, wherein said isolating means (7) have resilient properties and are mounted substantially vertical on a plurality of substantially horizontally directed brackets (10, 11) of which said brackets (10) are provided on said first member (4) and said brackets (11) are provided on second member (5), wherein said second member (5) is partly provided in said first member (4), wherein said first member (4) has openings (8), wherein said brackets (10) on said first member (4) are provided axially displaced relative to said openings (8) and extend outward from said first member (4), wherein said brackets (11) on said second member (5) extend outward therefrom and pass out through said openings (8) in said first member (4) such that portions of said brackets (11) on said second member (5) are situated in a substantially axial position relative to said brackets (10) on said first member (4), and wherein one of said plurality of isolating means (7) is mounted outside said first member (4) on a pair of brackets (10, 11) of which one bracket (10) is provided on said first member (4) and one bracket (11) on said second member (5).

2. Vibration isolator according to claim 1, wherein said first member (4) is cylindrical and has in both ends an open sleeve, wherein said second member (5) has a cylindrical shape and has an outer diameter which is less than an inner diameter of said first member (4), wherein there are at least three brackets (10) on said first member (4) which are directed radially outwards from said first member, wherein there are at least three brackets (11) on said second member (5) which are directed radially outwards from said second member, wherein said isolating means (7) extends in axial direction relative to said first member (4) and engages one of said brackets (10) on said first member (4) and one of said brackets (11) on said second member (5), and wherein said isolating means (7) is provided at such distance from said first member (4) that said isolating means (7) can move in radial and axial direction as well as in other directions relative to said first member (4), whereby said first and second members (4, 5) can spring in said vertical plane (VP) and said horizontal plane (HP) and in other directions relative to each other.

3. Vibration isolator according to claim 1, wherein said openings (8) in said first member (4) connect to an edge (9) of said first member (4).

4. A vibration isolator for isolating vibrations generated between two units (2, 3) of which at least one unit is an electronic unit (3), wherein said vibration isolator (1) includes a first member (4) connected to a first one of said two units (2, 3) and a second member (5) connected to a second one of said two units (2, 3), and a device (6) for isolating vibrations between said first and second members (4,5), said isolating device (6) including a plurality of isolating means (7) which are freely suspended between said first and second members (4, 5) such that said isolating means (7) are movable in a vertical plane (VP) and a horizontal plane (HP) as well as in other directions relative to said two units (2, 3), said isolating means (7) isolating vibrations between said two units (2, 3) in said vertical plane (VP) and said horizontal plane (HP) and in other directions, and a vibration damping or absorbing means (17) is provided between said second member (5) and a third member (16) through which said second member (5) is connected to one of said units (2, 3), wherein said vibration absorbing means (17) absorbs vibrations between said first and second units (2, 3) in said vertical plane (VP), said horizontal plane (HP) and in other directions.

5. Vibration isolator according to claim 4, wherein said vibration absorbing means (17) is sand.

6. Vibration isolator according to claim 4, wherein said vibration absorbing means (17) is particles of lead.

7. A vibration isolator for isolating vibrations generated between two units (2, 3) of which at least one unit is an electronic unit (3), wherein said vibration isolator (1) includes a first member (4) connected to a first one of said two units (2, 3) and a second member (5) connected to a second one of said two units (2, 3), and a device (6) for isolating vibrations between said first and second members (4,5), and wherein said isolating device (6) includes a plurality of isolating means (7) which are freely suspended between said first and second members (4, 5) such that said plurality of isolating means (7) are movable in a vertical plane (VP) and a horizontal plane (HP) as well as in other directions relative to said two units (2, 3), wherein said plurality of isolating means (7) isolates vibrations between said two units (2, 3) in said vertical plane (VP) and said horizontal plane (HP) and in other directions, wherein said plurality of isolating means (7) have resilient properties and are mounted substantially vertical on a plurality of substantially horizontally directed brackets (10, 11) of which said brackets (10) are provided on said first member (4) and said brackets (11) are provided on said second member (5);

wherein said second member (5) is partly provided in said first member (4), wherein said first member (4) has openings (8), wherein said brackets (10) on said first member (4) are provided axially displaced relative to said openings (8) and extend outward from said first member (4), wherein said brackets (11) on said second member (5) extend outward therefrom and pass out through said openings (8) in said first member (4) such that portions of said brackets (11) on said second member (5) are situated in a substantially axial position relative to said brackets (10) on said first member (4), and wherein one of said plurality of isolating means (7) is mounted outside said first member (4) on a pair of brackets (10, 11) of which one bracket (10) is provided on said first member (4) and one bracket (11) on said second member (5), wherein said brackets (10, 11) are designed to permit application of more than one isolating means (7) provided beside each other.

8. A vibration isolator for isolating vibrations generated between two units (2, 3) of which at least one unit is an electronic unit (3), wherein said vibration isolator (1) includes a first member (4) connected to a first one of said two units (2, 3) and a second member (5) connected to a second one of said two units (2, 3), and a device (6) for isolating vibrations between said first and second members (4,5), and wherein said isolating device (6) includes a plurality isolating means (7) which are freely suspended between said first and second members (4, 5) such that said isolating means (7) are movable in a vertical plane (VP) and a horizontal plane (HP) as well as in other directions relative to said two units (2, 3), said isolating means (7) isolating vibrations between said two units (2, 3) in said vertical plane (VP) and said horizontal plane ( HP) and in other directions, and a vibration damping or absorbing means (17) is provided between said second member (5) and a third member (16) through which said second member (5) is connected to one of said units (2, 3), and an elastic binder (18) is provided between said second member (5) and said third member (16) for holding said third member (16) and a particle shaped or pulverulent material in place relative to said second member (5), said elastic binder having such elasticity that said second and third members (5, 16) can move relative to each other in said vertical plane (VP) and said horizontal plane (HP) as well as other directions without transferring vibrations between said second and third members (5, 16).

* * * * *